Aug. 31, 1954     L. F. McNITT     2,687,860
MOUNTING

Filed April 13, 1949     3 Sheets-Sheet 1

INVENTOR.
Lewis F. McNitt.
BY
Harness and Harris
ATTORNEYS.

Aug. 31, 1954  L. F. McNITT  2,687,860
MOUNTING

Filed April 13, 1949  3 Sheets-Sheet 2

INVENTOR.
Lewis F. McNitt.
BY
Harness and Harris
ATTORNEYS

Patented Aug. 31, 1954

2,687,860

UNITED STATES PATENT OFFICE 2,687,860

MOUNTING

Lewis F. McNitt, Royal Oak, Mich., assignor to Chrysler Corporation, Highland Park, Mich., a corporation of Delaware Application April 13, 1949, Serial No. 87,278

1 Claim. (Cl. 248—5)

This invention concerns improvements in or relating to mountings for bodies which have overhung portions on either side of the mounting structure and which are subjected to gyroscopic forces of precession. Mountings of this kind are commonly provided for aircraft power plants particularly when the engine or turbine used is of an elongated type.

Known forms of this kind of mounting for an aircraft power plant commonly furnish restraint at different points along the length of the power plant for the purpose of limiting the degrees of freedom and amplitude of movement thereof to a minimum. As the length to diameter ratio of the power plant increases and as the speeds of rotation involved, increase it becomes more apparent that rigid constraints are not feasible.

Where blading is employed in high speed rotating apparatus, and where the stator casing is held from flexure, the rotor casing tends to bend under forces introduced due to axial tilt and the rotor and stator blades approach one another to create interference. On the other hand, certain portions of the casing for the power plant must be supported in order that they may be relieved of an undue bending burden and in order that at least some constraint is impressed upon the power plant relative to its bed.

The present invention has for its object the provision of a mounting which will insure support from both a linear and angular standpoint in immediate proximity to the center of gravity of the power plant.

According to the present invention, a mounting for the power plant comprises cooperating support members which serve as compound beams to resist the force of gravity, of axial thrust, and of angular rotation or roll due to reaction occasioned by the driven rotating member.

According to another feature of the invention the cooperating support members are disposed to lie in a common plane substantially containing the center of gravity of the power plant and extending transversely to the rotational axis of the machinery.

According to yet another feature of the invention, restraint struts are also provided in order to apply restraint where practicable and to leave portions of the engine casing demanding movement unrestrained. Those portions of the casing directly affected by the restraint struts are thereby inclined to be unloaded of bending stresses otherwise normally set up, which latter are instead communicated directly to the support members.

According to still another feature of the invention the restraint struts are paired and set relative to the support members so as mutually to diverge as they approach the latter and transmit with facility the necessary reactive stresses for overcoming precession couples which stem from the gyratory influences encountered in overall maneuvers of the machinery.

A specific embodiment of the invention, as it applies to mounting a power plant for an aircraft, will now be described merely by way of example with reference to the accompanying drawings, whereof:

Figure 1:
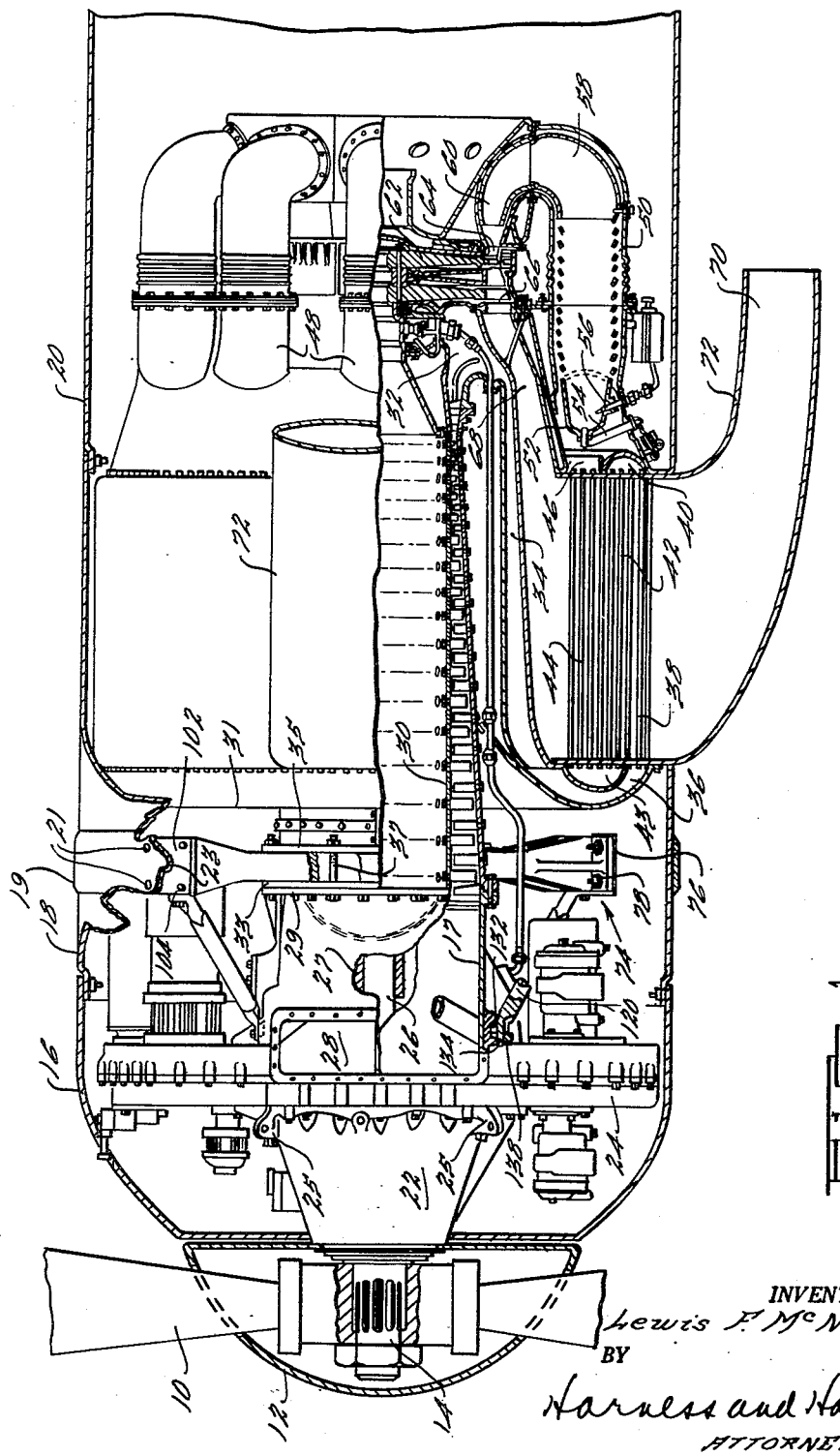
Figure 1 is a side view of the power plant with certain portions broken away and shown in section for the purposes of clarity.
Figure 2:
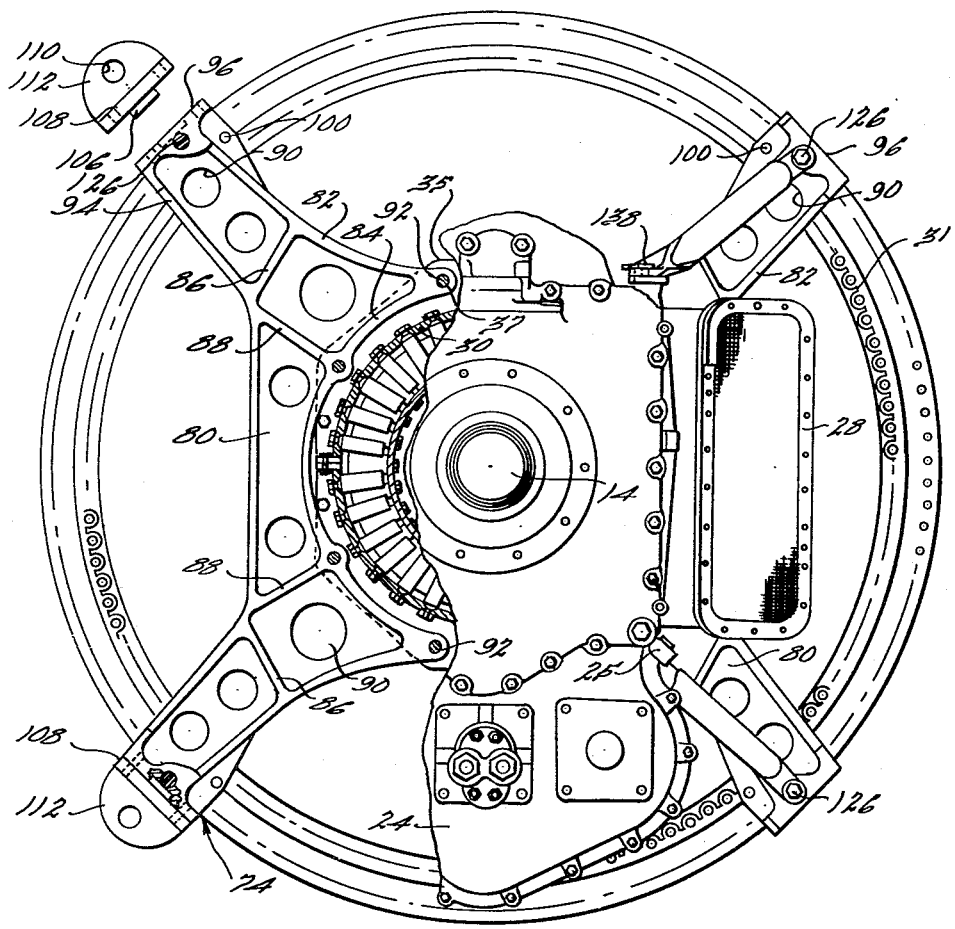
Figure 2 is a front view of the power plant of Figure 1 with certain parts shown in section.

As shown in Figures 1 and 2, the power plant is adapted to drive a propeller 10 of which the hub portion is enclosed within a fairing housing 12 for mounting on shaft 14. Structural sections 16, 18, and 20, in any number as desired, serve to represent the structure of the aircraft. These sections may be joined where necessary for assembly purposes. A reinforcing strip 19 is fancifully shown mounted around the periphery of section 18 for the purpose of providing suitable stiffness for receiving in appropriate support bracket fashion the mounting for the power plant. These support brackets formed of section 18 may carry shear pads 23 which together with apertures 21 provided in bracket section 18 and reinforcing strip 19 provide means by which the power plant mounting may be secured to the aircraft structure.

The casing 17 for the engine proper will be seen to extend from its position along gear box 22 rearwardly to blend as the stator housing for compressor 30. Lateral offsets of casing 17 adjacent the rear of gears 22 provide the handling eyes at 25 and an accessory gear case at 24. To the rearward of the front flange 29, marking the beginning of the compressor section, may be seen two peripheral flanges 33 and 35 which define a strip around the girth of compressor 30. This compressor is connected to gear box 22 and the propeller shaft 14 by means of a shaft 26 carried by suitable bearings 27 which are supported in the casing 17. The girth strip defined by flanges 33 and 35 is selected at a position along the longitudinal extent of the power plant such that it is generally in the immediate vicinity of the center of gravity of the power plant.

The relation of flanges 33 and 35 to the mounting for the power plant is set forth more in detail in an appropriate succeeding section of the discussion. To the rear of these flanges 33 and 35, and in surrounding relation to compressor 30 is provided an annular envelope or shell 31 which forms heat transfer passages for providing necessary heat recovery during operation of the power plant.

For a fuller and more complete understanding of the operating principles involved, reference may be had to copending application Serial No. 715,840, filed December 12, 1946, in the names of Staley et al., Patent No. 2,631,430.

Briefly, rearward of gear box 22 adjacent accessory case 24, are provided air scoops 28 through which air is drawn in order that it may be compressed, have fuel added to it for combustion and ultimately be consumed by the turbine component of the power plant. The air is led by suitable passages from scoop 28 along the inner periphery of engine casing 17 and through the axial flow compressor 30. Delivered at the rear end of compressor 30 in a compressed state, the air is deflected by suitable baffling passages 32 to reverse its path of flow and then is led forwardly along passage 34 formed in the sheet metal shell 31, which surrounds the compressor.

The path of the air is again reversed by means of passage 36 and directed through a first annulus of regenerator tubes 38 which discharge into reversing passage 40. By successive inward passes the compressed air is further directed through another bank of regenerator tubes 42 to enter reversing passage 43 where it again is passed along an inner set of tubes 44 for delivery into the annular chamber 46. In a manner which will be hereinafter set forth, the air acquires heat in its passage lengthwise through the tubes and is delivered into the chamber 46 at a relatively high temperature and pressure. Leading from the annular chamber 46 are to be observed a series of peripherally aligned individual sleeve type burners 48 by means of which the hot compressed air is finally prepared for consumption by the turbine.

The outer and inner sleeves of the burners define a longitudinal annular passage 50 from which the air is led inwardly through suitable baffles into the inner sleeve of the burner. At one end 52 of the inner sleeve of the burner are provided a fuel spray nozzle 54 and an igniter plug 56. These elements 54 and 56 serve respectively to introduce and ignite a spray of fuel which is delivered into the compressed air within burners 48. The burning fuel and its products of combustion are then passed downwardly of the individual burners 48 to a reversing turn 58 and there the individual paths of the energy gases are merged into a common annulus 60. Turbine 62 is so placed with respect to this annulus that nozzle vanes 64 direct the energy gases to impinge upon turbine blading 66 and the torque imparted thereto is then transmitted forward to the compressor, accessory case, and propeller by suitable shafts and gearing. The spent gases discharged from the turbine are then delivered through a passage 68 in cross-flow fashion to pass over and heat the respective sets of regenerator tubes 44, 42, and 38. Provided at appropriate locations along the outside of sheet metal envelope 31 are to be seen exhaust collectors 72 which receive the outwardly flowing spent gases and direct them through jet nozzles 70 in a direction toward the rear of the machinery just set forth.

Figure 3:
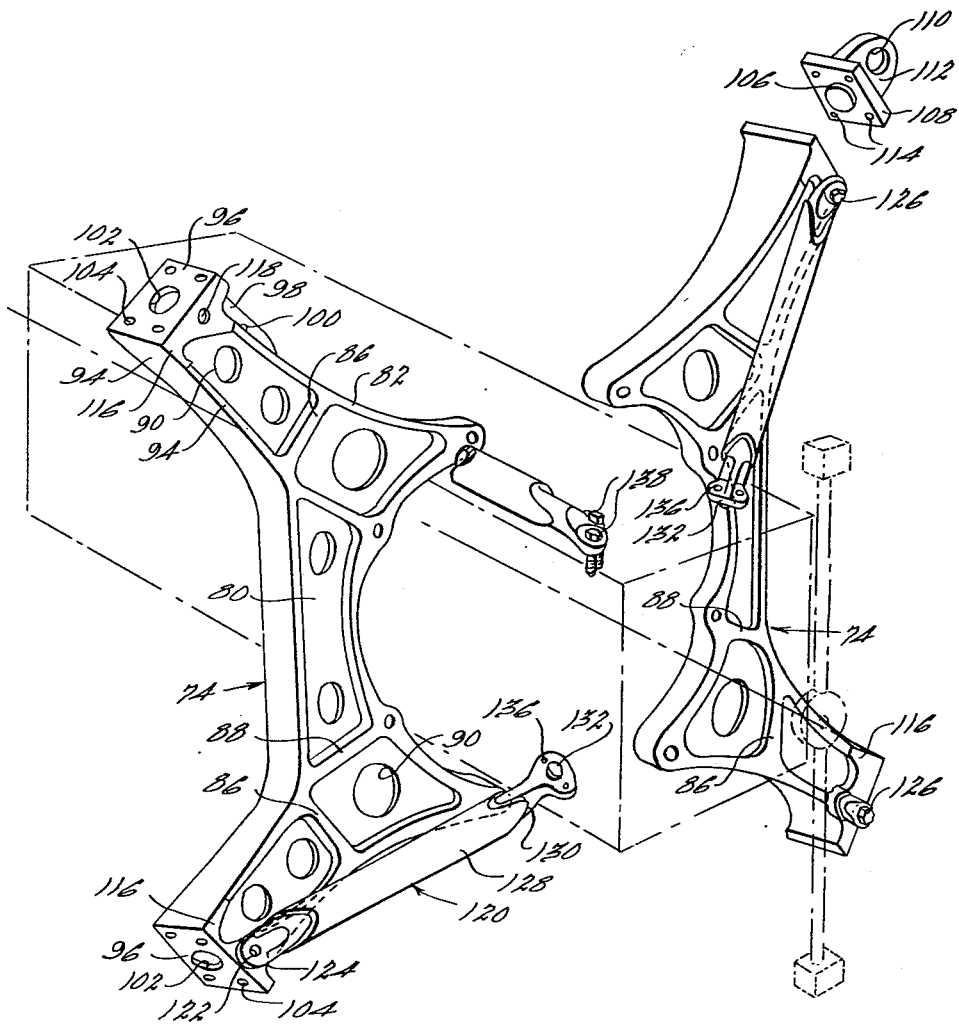
Figure 3 is a perspective view of the mounting structure in conjunction with the power plant shown in phantom in effort to establish the relationship there involved.

As particularly brought out in Figures 1 and 3 the turbo-prop engine will be seen to be supported in the aircraft structure through the sole medium of beam structure 74. Suitable pads 76 may be interposed at the juncture with the support brackets of the aircraft structure to receive the individual feet of beam members 80 and by appropriate fasteners such as at 78 the support mounting 74 may be firmly attached to the aircraft structure.

In Figure 2 is represented a plan view of one beam member 80 going to comprise the support 74. An outer margin reinforcing rib 82 and inner margin reinforcing rib 84 are provided on the member 80 to impart rigidity thereto. The inner rib 84 will be seen to be of a general arcuate configuration and of the general appearance of a reinforcing flange. Intermediate ribs such as at 86 and 88 supply additional rigidity to the outer reaches of member 80.

Member 80 is provided with two radially extending arms such that when paired with its complementary member will present the appearance of an X-frame. Lightening holes 90 are provided throughout the structure and along the inner arcuate flange there are provided fastening apertures 92 for securing member 80 to the forward end of the compressor. Bolts 37 are adapted to pass through the girth flanges of the compressor in which are provided complementary apertures for registry with the apertures 92 in member 80. The bolts 37 insure a rigid fit between the members involved. At the end of arm 94 of member 80 is provided a faced-off bearing surface 96 best seen in Figures 2 and 3, which has an overhanging portion supported by a rib 98 in which may be formed a handling aperture 100. In face 96 there is formed a recess 102 for receiving shear pads 23 and also openings 104 for receiving fasteners. An additional cooperating shear pad 106 is also adapted to be received in recess 102. Fastened to shear pad 106 is a shipping device 108 upon which is formed a radiating lug 112 provided with a pad-eye aperture 110. Suitable bolt apertures for fasteners like fasteners 78 are provided in device 108 which, when shear pad 106 comes into registry with recess 102, are adapted to come into registry likewise with apertures 104. Shipping devices 108 are of advantage in transporting the turbo-prop machinery for ultimate assembly in an aircraft since they protect the bearing face 96 of each arm 94 and also provide a suitable pad-eye for use in handling the machinery.

Beam members 80 just described will be observed to have sufficient thickness to serve in the form of compound beams in supporting the machinery. The design of each arm is suitable for the resisting of any rolling effect or tendency of the machinery such as may be due to the reaction from propeller 16 and also are of a sufficient depth to resist any axial thrust imparted by the propeller. The support members 80 may be seen to be sufficient of themselves to withstand gravity forces while supporting the engine during final assembly in the aircraft.

It will be recalled that a rigid attachment is provided between the arcuate rib 84 formed on member 80 and the girth flanges of the compressor in order to amply support the machinery adjacent the center of gravity thereof. However, additional means must be provided in the form of restraint struts 120 to resist a yawing or pitching tendency of the power plant.

Actually the primary consideration in this regard is the gyratory reaction involved with such high speed machinery wherein the axis of rotation is subject to rapid changes in inclination. That is to say, if the axis of rotation is tilted in pitch-like motion, the gyratory reaction or precession will tend to become evident in a yaw-like direction or more specifically, in a plane of 90° to the plane in which the axis of rotation is attempted to be deflected.

As previously stated, constraint at a plurality of points along the casing which carries the stator blading is not feasible since a deflection of the casing which bears the rotor requires a deflection of the stator casing in order to prevent interference between the sets of blading. These same requirements are of course not applicable to all components of the machinery and suitable restraint may be imposed upon the gear box casing or upon such intermediate portions of the engine casing as desired. To this end, a faced-off portion 116 is formed along the forward surface of beam member 80 and a suitable bore 118 is provided therethrough for the depth of each arm 94. One end of each restraint member 120 is formed as at 124 with an aperture 122 for registry with aperture 118 in the faced off portion 116. A suitable fastener 126 attaches the two members together at a location adjacent the point of attachment of arm 94 with the support brackets in the aircraft structure or with the shipping devices 108 as the case may be. The body portions 128 of member 120 inclines convergingly forward to its opposite end portion 130 which is provided with a suitable shear pad 132 and apertures 136.

Examination of Figure 1 will reveal that complementary recesses 134 are provided in engine casing 17 for receiving the shear pads 132 in much the same fashion that the complementary shear pads 23 formed on the aircraft structure are received in aperture 102 formed in each arm of the support beam. Fasteners or bolts 138 are then inserted through the aperture 136 in restraint strut 120 into threadable engagement with the engine casing in order to form with shear pad 132 a rigid attachment between member 120 and the engine casing 17. By virtue of the rigid attachment of each member 120 with the engine casing, stresses set up in the casing may be communicated directly to the support beams 80 without exposing the intermediate portions of engine casing 17 to the unnecessary bending to which they would otherwise be subjected. Since no single member 120 is parallel to any other member 120 and since together they assume a frusto-pyramidal arrangement, moments in any direction along the rotational axis of the machinery may be amply accommodated by the members 120 and transmitted directly to the rigid support beams 80. By way of illustration, in case the axis of rotation is tilted in a plane substantially containing two of the oppositely disposed members 120, and since the gyroscopic forces of precession operate in a plane substantially 90° thereto the counterpart pair of oppositely disposed members 120 will be available to resist the bending couple there resulting. Any combined yawing or pitching tendency of the engine will be resisted by at least two of the struts 120 and except in special instances will be resisted by a combination of the four struts in much the same fashion as will be precessive forces.

Essentially, support beams 80 provide for support of the machinery in a rolling motion, in a linear axial motion, and in any linear motion due to the action of gravity. The strut members 120 provide the necessary restraint in respect of gyratory couples which tend to set up bending stresses along the axis of rotation. In either case the reaction upon the aircraft structure is manifested only at points along the outside periphery of the individual arms 94 of the X-frame structure. There has thus been provided an overall mounting which from an assembly standpoint is highly feasible in that the mounting need be attached directly to the supporting aircraft structure in only those locations which may lie in the plane substantially containing the center of gravity of the machinery, there being four such locations shown. Another advantage of the disclosed mounting lies in the fact that the turbine and compressor components of the machinery are allowed general flexure to accommodate operational yawing, pitching, and precession tendencies; yet restraint is provided in appropriate areas in order that the axis of rotation of the machinery may be held to within the general confines of the bed position allocated to it in the aircraft structure.

Although one constructional embodiment of my invention has been described and illustrated in detail, it is to be understood that the invention can be embodied in other forms without departure from its spirit.

What is claimed is:

Structure for mounting an aircraft engine in an engine bed comprising radial flanges disposed closely adjacent each other to define an annular recess extended at least partially about an engine and intersected by a transverse plane passing through the center of gravity occurring on the longitudinal principal axis of inertia of the engine, support brackets adapted to be attached to an engine bed in radial alignment with said recess, a rigid X-frame, having two parts each comprising two arm portions connected rigidly to said support brackets and a portion connecting the arm portions lying in the recess and fixedly secured to said flanges, and strut means connected to the arm portions adjacent the ends thereof and adapted to be connected to an engine at points spaced from said flanges.

References Cited in the file of this patent

UNITED STATES PATENTS

| Number | Name | Date |
|---|---|---|
| 1,392,655 | Postel-Vinay | Oct. 4, 1921 |
| 1,959,969 | Saurer | May 22, 1934 |
| 2,327,062 | Preston | Aug. 17, 1943 |
| 2,346,680 | Harper | Apr. 18, 1944 |
| 2,411,562 | Thompson | Nov. 26, 1946 |
| 2,418,868 | Cole et al. | Apr. 15, 1947 |
| 2,479,573 | Howard | Aug. 23, 1949 |
| 2,481,547 | Walker et al. | Sept. 13, 1949 |
| 2,529,955 | Morley | Nov. 14, 1950 |
| 2,529,958 | Owner et al. | Nov. 14, 1950 |
| 2,539,960 | Marchant et al. | Jan. 30, 1951 |